United States Patent
Fredrick

(10) Patent No.: US 10,662,677 B1
(45) Date of Patent: May 26, 2020

(54) GATE LATCHING SYSTEM

(71) Applicant: KB ENTERPRISE, LLC, Lamont, OK (US)

(72) Inventor: Brad Warren Fredrick, Lamont, OK (US)

(73) Assignee: KB ENTERPRISE, LLC, Lamont, OK (US)

( * ) Notice: Subject to any disclaimer, the term of this patent is extended or adjusted under 35 U.S.C. 154(b) by 1007 days.

(21) Appl. No.: 14/869,069

(22) Filed: Sep. 29, 2015

Related U.S. Application Data

(63) Continuation-in-part of application No. 14/853,195, filed on Sep. 14, 2015, now abandoned.

(60) Provisional application No. 62/053,488, filed on Sep. 22, 2014.

(51) Int. Cl.
| | |
|---|---|
| *E05B 65/00* | (2006.01) |
| *E05C 19/00* | (2006.01) |
| *E05C 7/02* | (2006.01) |
| *E05C 21/00* | (2006.01) |
| *A01K 1/00* | (2006.01) |
| *E06B 11/02* | (2006.01) |

(52) U.S. Cl.
CPC ........ *E05B 65/0007* (2013.01); *A01K 1/0017* (2013.01); *E05C 7/02* (2013.01); *E05C 19/006* (2013.01); *E05C 21/00* (2013.01); *E06B 11/022* (2013.01)

(58) Field of Classification Search
CPC .......... E05C 7/04; E05C 17/40; E05C 19/006; E05C 7/02; E05C 21/00; E05B 65/0007; E05B 67/383; Y10T 292/42; Y10T 292/45; Y10T 292/47; Y10T 292/03; Y10T 292/23; Y10T 292/28; Y10T 292/34; Y10T 292/37; A01K 1/0017; E06B 11/02; E06B 11/022; Y10S 292/29; Y10S 292/53; Y10S 292/54
USPC ........... 292/300, 305, 306, DIG. 13; 256/73, 256/65.13, 65.12
See application file for complete search history.

(56) References Cited

U.S. PATENT DOCUMENTS

| | | | | | |
|---|---|---|---|---|---|
| 1,258,624 | A | * | 3/1918 | Swank | ................ E05B 65/0007 292/3 |
| 3,926,018 | A | * | 12/1975 | Joersz | ................. E05B 65/0007 70/19 |

(Continued)

FOREIGN PATENT DOCUMENTS

| | | | | |
|---|---|---|---|---|
| EP | 0636761 A1 | * | 2/1995 | .............. E06B 11/02 |
| EP | 0761911 A1 | * | 3/1997 | ............ E01F 13/022 |

*Primary Examiner* — Christine M Mills
(74) *Attorney, Agent, or Firm* — McAfee & Taft

(57) ABSTRACT

The present invention is a gate latching system for use in securing a pair of cooperating stock gates together. A preferred embodiment of the invention employs a pair of latching devices for securing a pair of overlapping stock gates together in a closed position. An alternate embodiment of the invention is designed with an extended arm for securing a pair of stock gates closed when the stock gates do not overlap. Both pairs of latching devices are designed so that one of the latching devices is bolted to one gate and the other latching device is bolted to the other gate. Each latching device has a u-shaped receiver for receiving a horizontal member of the opposite gate. The horizontal members enter the u-shaped receivers by lifting one of the gates as the gates are being closed and are secure therein by a lid that closes over one receiver.

6 Claims, 5 Drawing Sheets

(56) References Cited

U.S. PATENT DOCUMENTS

| | | | | |
|---|---|---|---|---|
| 4,047,332 | A | * | 9/1977 | Benoit ..................... E05D 7/06 |
| | | | | 49/236 |
| 4,741,564 | A | | 5/1988 | Alford |
| 6,422,613 | B1 | | 7/2002 | Boroviak |
| 6,808,212 | B1 | | 10/2004 | Hardee |
| 6,845,970 | B1 | * | 1/2005 | Kenton ............... E04G 21/3233 |
| | | | | 256/73 |
| 7,017,958 | B1 | * | 3/2006 | Bowers .................. E05C 19/08 |
| | | | | 256/1 |
| 7,878,558 | B1 | | 2/2011 | Bell |
| 8,690,201 | B2 | | 4/2014 | Frazier |
| 2006/0038416 | A1 | | 2/2006 | Nesseth |
| 2012/0274081 | A1 | * | 11/2012 | Frazier ......................... 292/137 |

* cited by examiner

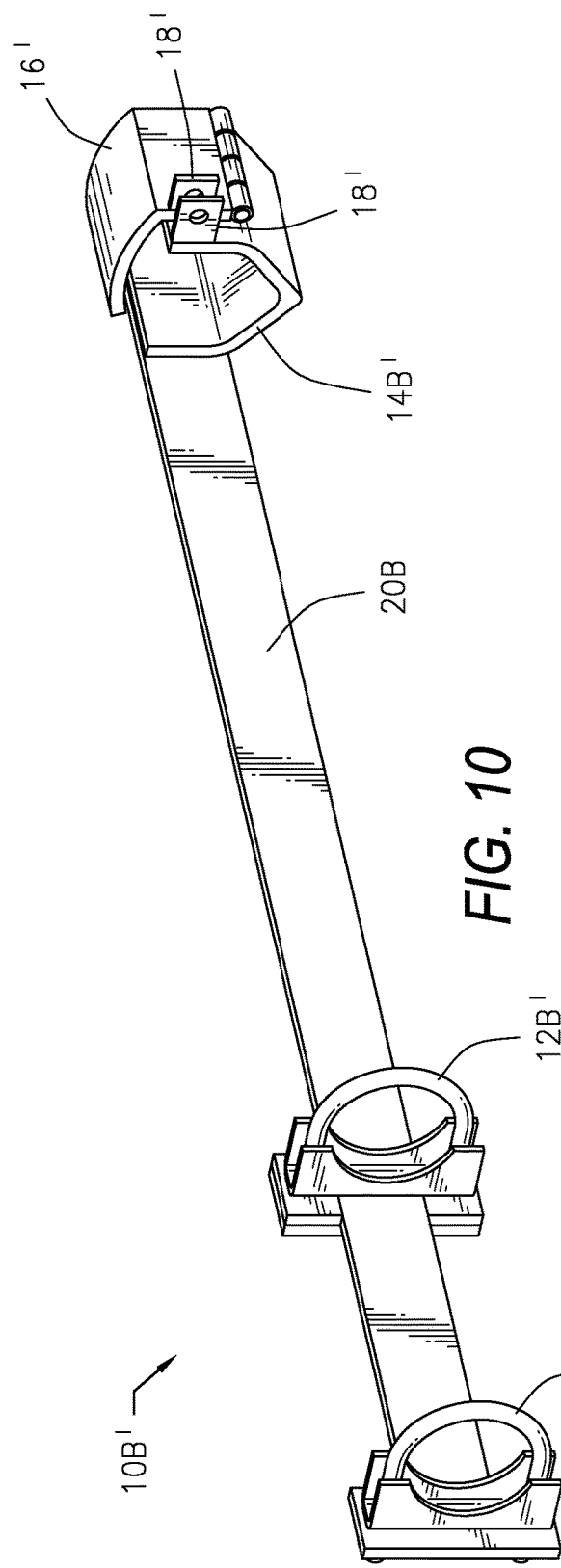
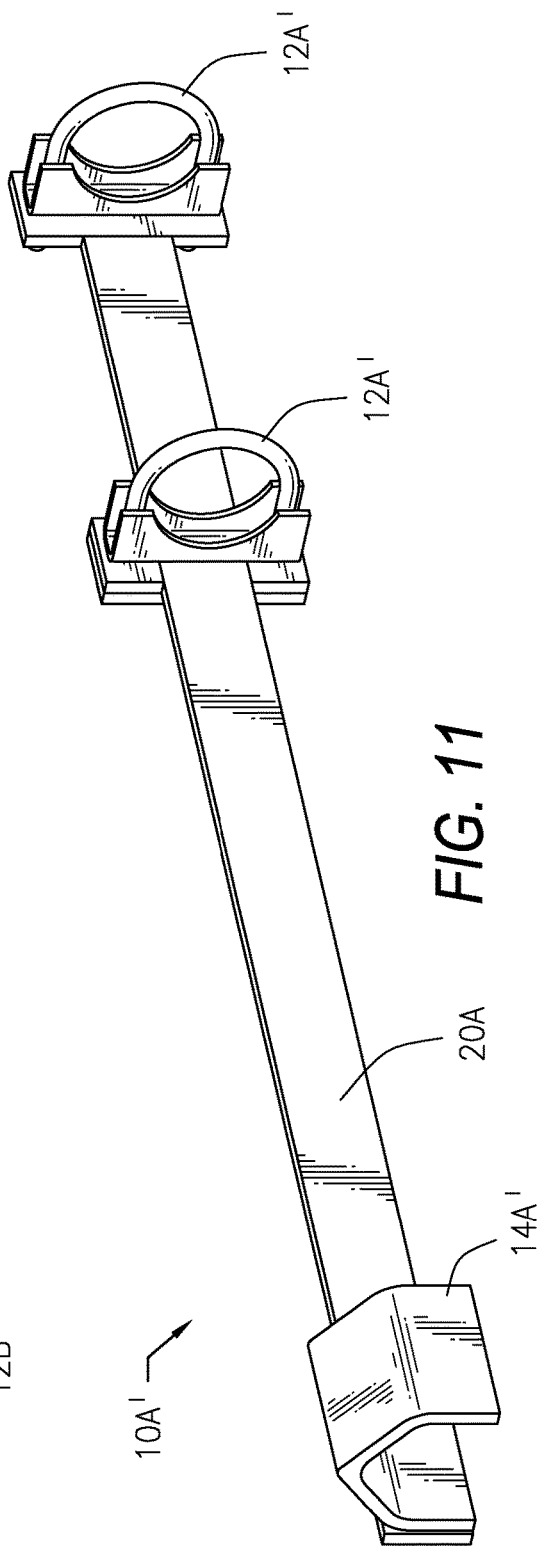
FIG. 10
FIG. 11

GATE LATCHING SYSTEM

CROSS-REFERENCE TO RELATED APPLICATIONS

The present application is a continuation in part of U.S. patent application Ser. No. 14/853,195 for Gate Latching System that was filed on Sep. 14, 2015, which in turn claims priority to U.S. Provisional Patent Application Ser. No. 62/053,488 for Gate Latching System filed on Sep. 22, 2014.

BACKGROUND OF THE INVENTION

1. Field of the Invention

The present invention is a gate latching system for use in securing a pair of stock gates together. More specifically, a preferred embodiment of the present invention is a system employing a pair of latching devices for securing a pair of overlapping stock gates together in a closed position. An alternate embodiment of the invention is designed for securing a pair of stock gates closed when the stock gates either do not overlap each other sufficiently when closed to allow usage of the preferred embodiment or when the pair of stock gates do not overlap each other at all and there is a gap existing between the pair of stock gates when they are closed.

2. Description of the Related Art

Large gate openings to fields or pasture are desirable as they allow vehicles and farm equipment to pass through more easily. When a gate opening is too large to be spanned by a single stock gate, then a pair of opposing stock gates is employed as a means of securing the gate opening against passage of vehicles and farm animals.

One of the gates of the pair is generally hinged to a post on one side of the gate opening and the other gate of the pair is hinged to a post on the opposite side of the gate opening. With the pair of gates thus hinged, they can be opened to allow full access through the entire width of the gate opening.

Because the gate openings are often non-standard widths, pairs of gates either overlap each other when they are closed or have a gap between them when they are closed. This makes securing the pair of gates closed and making sure that livestock cannot pass between the gates somewhat problematic.

Traditionally, opposing pairs of gates have been chained together and the ends of the chain held together by a fastener or padlock or the gates have been wired together with metal wire. There are several problems associated with these two systems for securing opposing gates together.

Both of these two systems for securing opposing gates together are time consuming when securing the gates together and are time consuming when opening the gates when once they are secured together.

Also, once the chain or wire has been loosened from the gates, the chain or wire tends to fall off the gates and onto the ground. When the chain or wire falls to the ground, it is susceptible to being run over by vehicles as they pass through the gate opening and can cause damage to the tires of the vehicles. Once the chain or wire falls on the ground, it can become lost in the grass, or it can become muddy or dirty with animal excrement making it messy and unpleasant to retrieve for reuse Another problem with the two traditional systems for securing opposing gates together is that the chain or wire used to hold the gates together often allows some play or movement in the gates and does not hold the gates together rigidly. Depending on whether the gates overlap each other when closed, the play in the gates can allow livestock to push against the gates and open them sufficiently to allow smaller animals, such as calves, to pass through the enlarged gap created between non-overlapping opposing gates.

Still a further weakness with the two traditional systems for securing opposing gates together is that the wire or chain can easily be removed using wire cutters or bolt cutters, permitting enter through the gate opening by cattle thieves or other unauthorized persons. With the current high price of cattle, there is a need for a more secure system for securing opposing stock gates.

The present invention addresses these problems by providing a system for securing opposing gates together that employ a pair of latching devices that secure to the gates and do not fall off when the gates are opened. The present invention is easy to operate when opening or closing the gates, is capable of being locked with a padlock when the gates need to be secured against unauthorized entry, is designed to hold the gates rigidly together when locked, and is made in two different embodiments for use on overlapping and non-overlapping pairs of gates.

SUMMARY OF THE INVENTION

The present invention is a gate latching system for use in securing a pair of stock gates together. More specifically, a preferred embodiment of the present invention is a system employing a pair of latching devices for securing a pair of overlapping stock gates together in a closed position. An alternate embodiment of the invention is designed for securing a pair of stock gates closed when the stock gates either do not overlap each other sufficiently when closed to allow usage of the preferred embodiment or when the pair of stock gates do not overlap each other at all and there is a gap existing between the pair of stock gates when they are closed.

The preferred embodiment employs a pair of latching devices where the two latching devices are constructed different from each other and with each of the latching devices of the pair being designed for attachment to a separate gate of an overlapping pair of gates.

The first latching device of the pair of latching devices secures via first u-bolts around a vertical member of a first gate of the pair of gates and is provided with a first u-shaped receiver oriented at a right angle to the first u-bolts so the first u-shaped receiver faces or opens downward and is able to rest over a horizontal member of the opposite overlapping second gate when the gates are closed.

The second latching device of the pair of latching devices secures via second u-bolts around a vertical member of the second gate of the pair of gates and is provided with a second u-shaped receiver oriented at a right angle to the second u-bolts so the second u-shaped receiver faces or opens upward and is able to receive a horizontal member of the opposite overlapping first gate when the gates are closed.

The second latching device is also provided with a hinged lid attached to the second u-shaped receiver that can be pivoted open to admit the horizontal member of the first gate into the second u-shaped receiver and can be pivoted closed to secure the horizontal member of the first gate within the second u-shaped receiver. The second u-shaped receiver and the hinged lid are each provided with an eye located so that the eyes align when the hinged lid is closed and are capable of receiving therein a padlock as a means of locking the gates against unauthorized entry.

When the pair of gates does not overlap, an alternate embodiment gate latching system is employed. The alternate embodiment employs a pair of alternate latching devices where the two alternate latching devices are constructed different from each other and with each of the alternate latching devices of the pair being designed for attachment to a separate gate of a non-overlapping pair of gates.

The alternate first latching device of the pair of alternate latching devices secures via alternate first u-bolts around a horizontal member of a first gate of the pair of gates and is provided with a first arm that extends several inches to an alternate first u-shaped receiver. The alternate first u-shaped receiver is aligned with the alternate first u-bolts so the alternate first u-shaped receiver faces or opens downward and is able to rest over a horizontal member of the opposite non-overlapping second gate when the gates are closed.

The second alternate latching device of the pair of alternate latching devices secures via alternate second u-bolts around a horizontal member of the second gate of the pair of gates and is provided with a second arm that extends several inches to an alternate second u-shaped receiver. The alternate second u-shaped receiver is aligned with the alternate second u-bolts so the alternate second u-shaped receiver faces or opens upward and is able to receive a horizontal member of the opposite non-overlapping first gate when the gates are closed.

The alternate second latching device is also provided with an alternate hinged lid attached to the alternate second u-shaped receiver that can be pivoted open to admit the horizontal member of the first gate into the alternate second u-shaped receiver and can be pivoted closed to secure the horizontal member of the first gate within the alternate second u-shaped receiver. The alternate second u-shaped receiver and the alternate hinged lid are each provided with an alternate eye located so that the alternate eyes align when the alternate hinged lid is closed and are capable of receiving therein a padlock as a means of locking the gates against unauthorized entry.

BRIEF DESCRIPTION OF THE DRAWINGS

FIG. 10 is an enlarged view of a second alternated latching device of the pair of alternate embodiment latching devices of FIGS. 6 and 7.

FIG. 11 is an enlarged view of a first alternate latching device of the pair of alternate embodiment latching devices of FIGS. 6 and 7.

DETAILED DESCRIPTION OF THE PREFERRED EMBODIMENT

Figure 1:
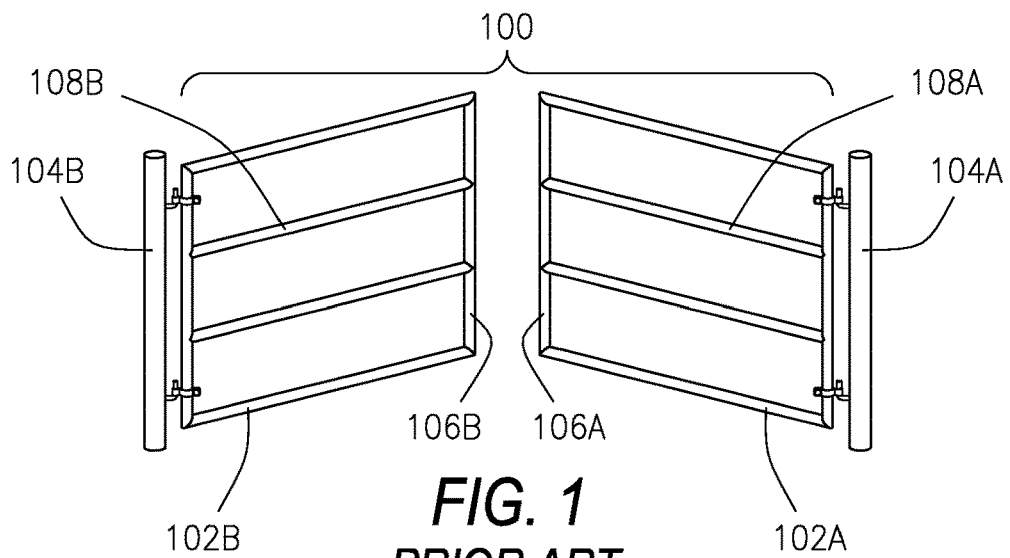
FIG. 1 is a pair of cooperating prior art stock gates shown hinged to posts located on opposite sides of a gate opening with the gates swung to a partially open position.
Figure 2:
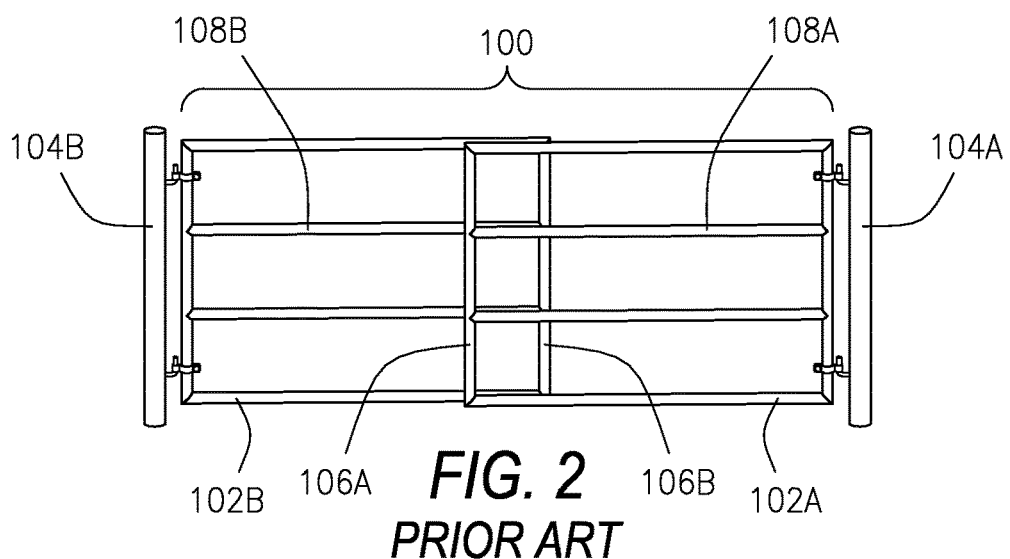
FIG. 2 is a pair of cooperating prior art stock gates shown in a closed position where the gates overlap each other.

Referring now to the drawings, and initially to FIGS. 1 and 2 there is shown a prior art gate opening 100 that is spanned by a pair of cooperating stock gates 102A and 102B. The two gates 102A and 102B are hinged to posts 104A and 104B located on either side of the gate opening 100 with the gates 102A and 102B swinging away from each other as they are opened, as illustrated in FIG. 1, and swinging together so that they overlap each other when closed, as illustrated in FIG. 2.

Figure 4:
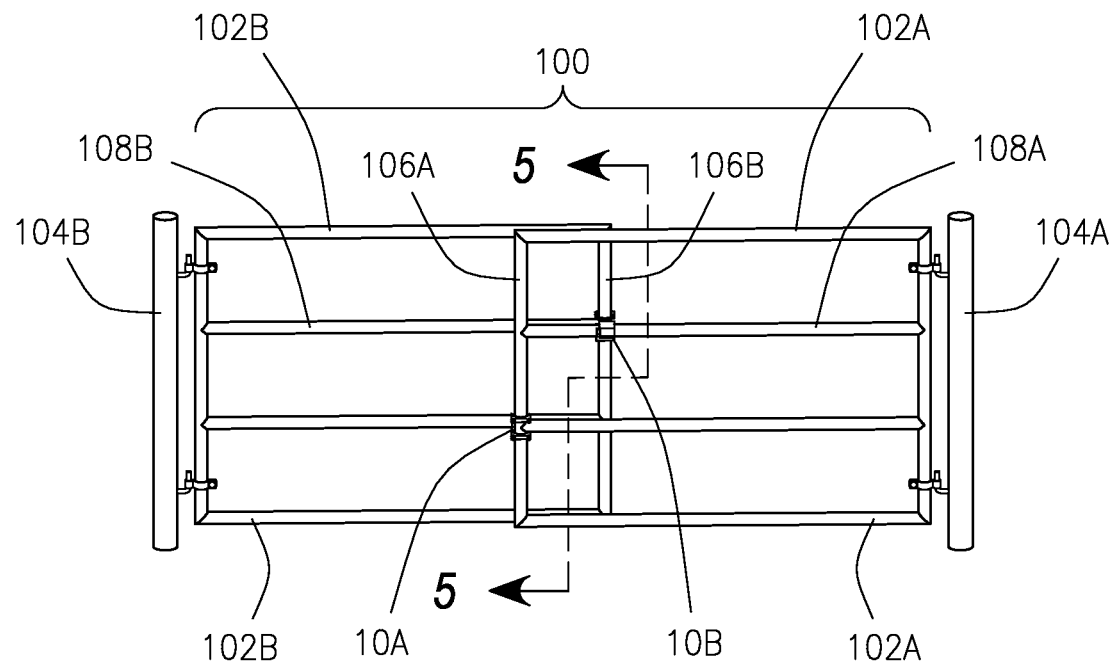
FIG. 4 is the pair of cooperating prior art stock gates of FIG. 2 shown secured together with a gate latching system that is constructed in accordance with a preferred embodiment of the present invention.
Figure 5:
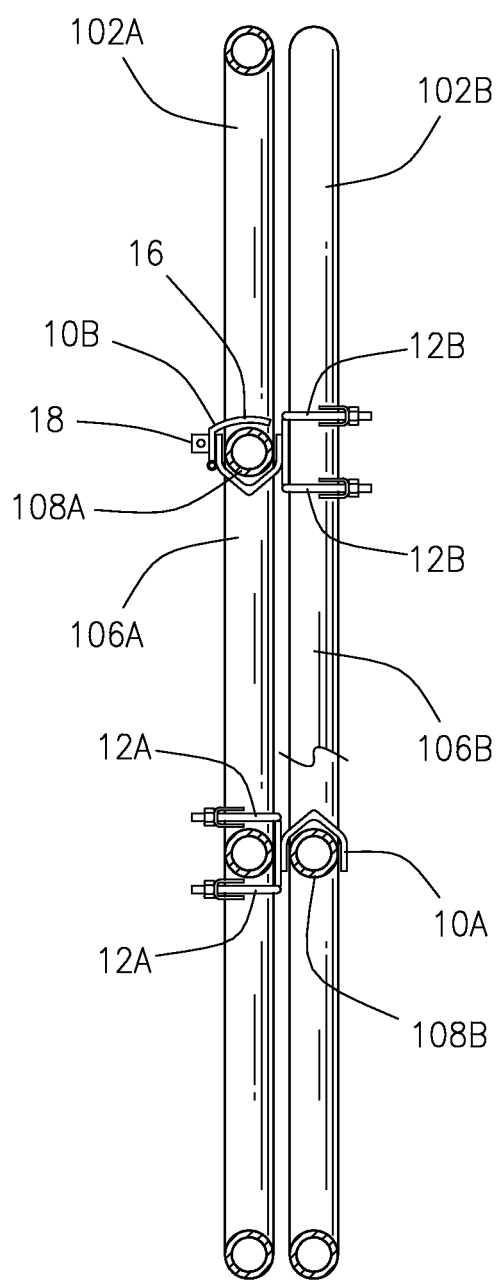
FIG. 5 is a cross sectional view taken along line 5-5 of FIG. 4.

As illustrated in FIGS. 4 and 5, a preferred embodiment of the present invention is a gate latching system employing a pair of latching devices 10A and 10B for securing a pair of cooperating overlapping stock gates 102A and 102B together in a closed position.

Figure 8:
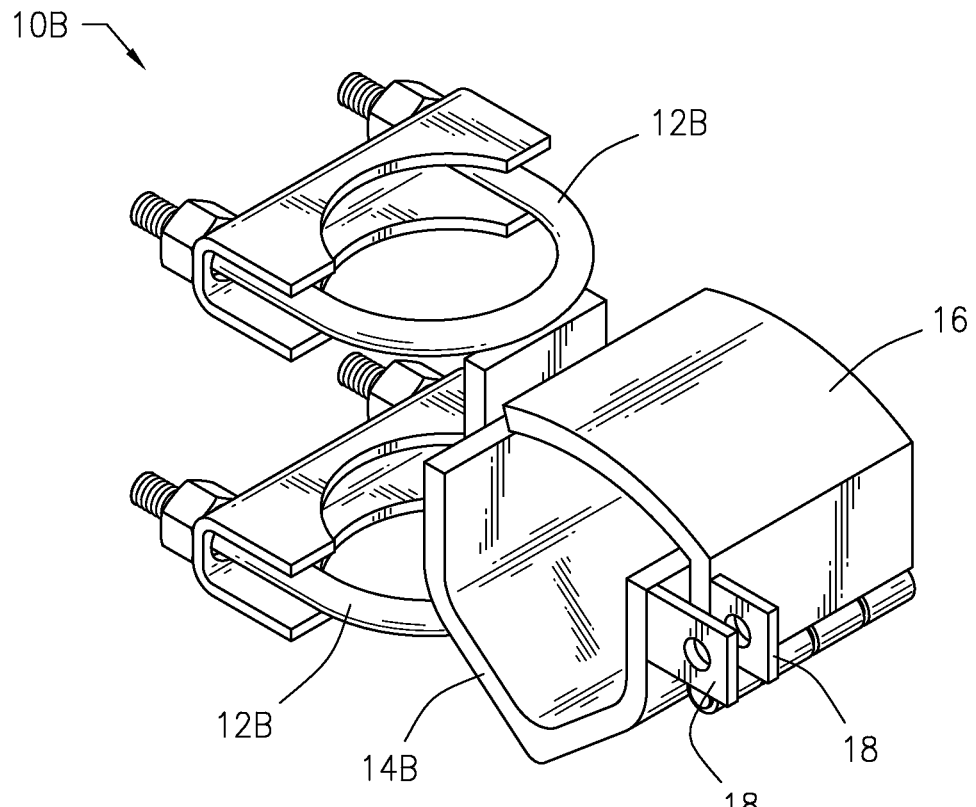
FIG. 8 is an enlarged view of a second latching device of the pair of preferred embodiment latching devices of FIGS. 4 and 5.
Figure 9:
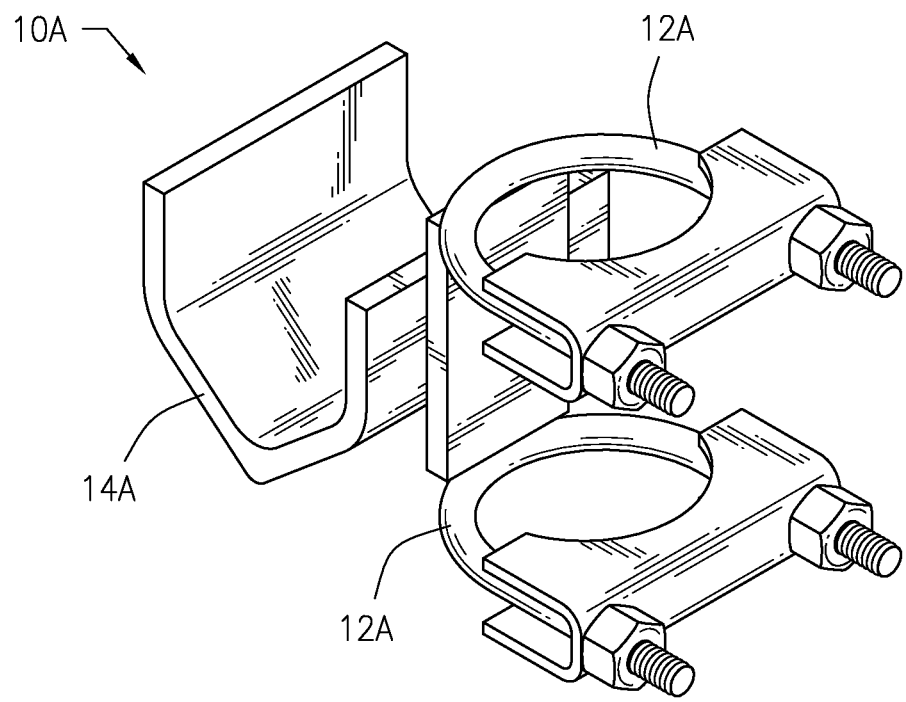
FIG. 9 is an enlarged view of a first latching device of the pair of preferred embodiment latching devices of FIGS. 4 and 5.

Referring now also to FIGS. 8 and 9, the preferred embodiment employs a pair of latching devices 10A and 10B where the two latching devices 10A and 10B are constructed different from each other and with each of the latching devices 10A and 10B of the pair being designed for attachment to a separate gate 102A or 102B of an overlapping pair of gates 102A and 102B.

The first latching device 10A of the pair of latching devices 10A and 10B secures via first u-bolts 12A around a vertical member 106A of a first gate 102A of the pair of gates 102A and 102B and is provided with a first u-shaped receiver 14A oriented at approximately a right angle to the first u-bolts 12A so the first u-shaped receiver 14A faces or opens downward and is able to rest over a horizontal member 108B of the opposite overlapping second gate 102B when the gates 102A and 102B are closed.

The second latching device 10B of the pair of latching devices 10A and 10B secures via second u-bolts 12B around a vertical member 106B of the second gate 102B of the pair of gates 102A and 102B and is provided with a second u-shaped receiver 14B oriented at approximately a right angle to the second u-bolts 12B so the second u-shaped receiver 14B faces or opens upward and is able to receive a horizontal member 108A of the opposite overlapping first gate 102A when the gates 102A and 102B are closed.

The second latching device 10B is also provided with a hinged lid 16 attached to the second u-shaped receiver 14B that can be pivoted open to admit the horizontal member 108A of the first gate 102A into the second u-shaped receiver 14B and can be pivoted closed to secure the horizontal member 108A of the first gate 102A within the second u-shaped receiver 14B. The second u-shaped receiver 14B and the hinged lid 16 are each provided with an eye 18 located so that the eyes 18 align when the hinged lid 16 is closed and are capable of receiving therein a padlock (not illustrated) as a means of locking the gates 102A and 102B against unauthorized entry.

In use, the hinged lid 16 is pivoted open and the pair of gates 102A and 102B is swung shut. As the gates 102A and 102B are being closed, the first gate 102A is raised sufficiently to simultaneously allow the first u-shaped receiver 14A to rest over the horizontal member 108B of the second gate 102B and the second u-shaped receiver 14B to cradle the horizontal member 108A of the first gate 102A. Next, the hinged lid 16 is pivoted closed over the second u-shaped receiver 14B, capturing the horizontal member 108A of the first gate 102A within the second u-shaped receiver 14B and thereby securing the gates 102A and 102B together by preventing the first gate 102A from being lifted upward to disengage from the second gate 102B. If desired, a locking device (not illustrated), such as a padlock or other similar device can be inserted through the aligned eyes 18 provided on the second latching device 10B as a means of locking the gates 102A and 102B more securely.

In order to opening the gates 102A and 102B, the padlock or other similar device is removed from the aligned eyes 18 on the second latching device 10B, the hinged lid 16 is pivoted open, the first gate 102A is raised upward, and the gates 102A and 102B swung apart.

Figure 3:
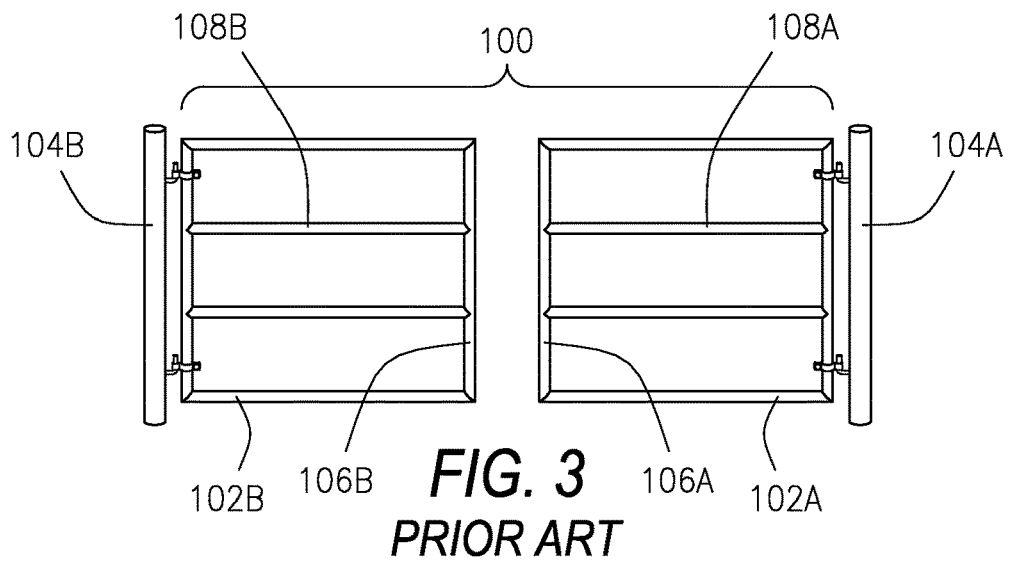
FIG. 3 is a pair of cooperating prior art stock gates shown in a closed position where the gates do not overlap each other.

As illustrated in FIG. 3, when the gate opening 100 is larger than the combined lengths of the gates 102A and 102B, they will not overlap as they swing together and there will be a gap 110 between the two closed non-overlapping gates 102A and 102B.

Figure 6:
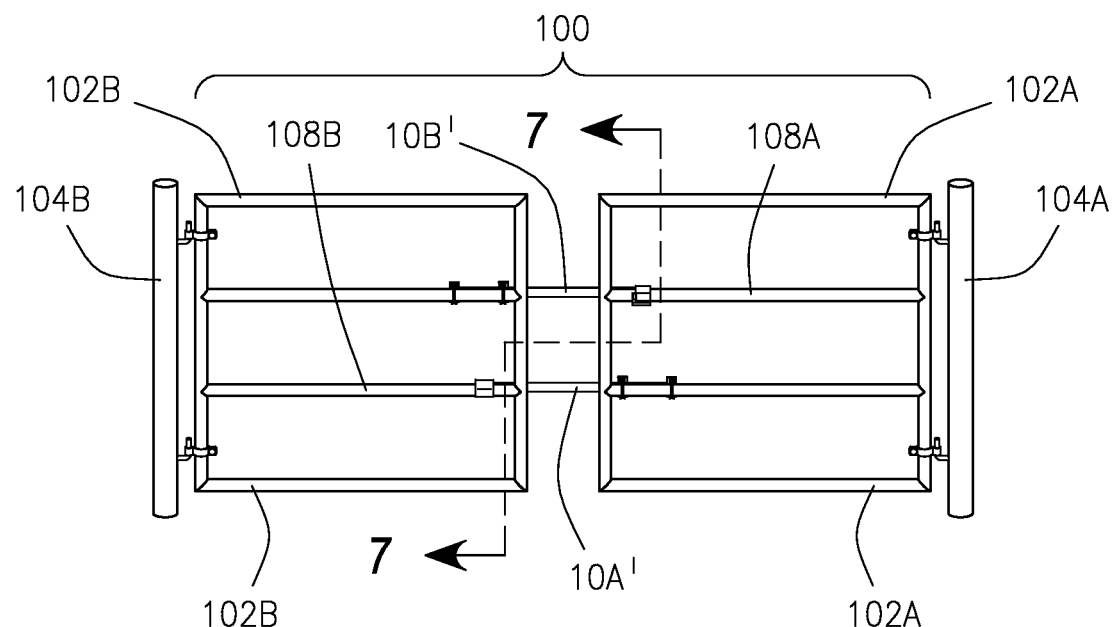
FIG. 6 is the pair of cooperating prior art stock gates of FIG. 3 shown secured together with an alternated gate latching system according to an alternate embodiment of the present invention.
Figure 7:
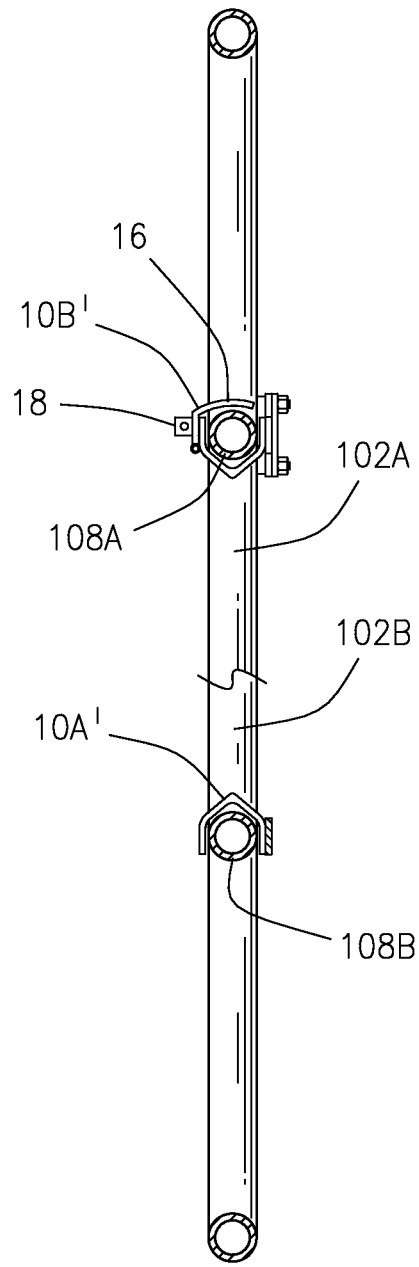
FIG. 7 is a cross sectional view taken along line 7-7 of FIG. 6.

As illustrated in FIGS. 6 and 7, an alternate embodiment of the invention is designed for securing a pair of stock gates 102A and 102B closed when the stock gates 102A and 102B either do not overlap each other sufficiently when closed to allow usage of the preferred embodiment gate latching system or when the pair of stock gates 102A and 102B do not overlap each other at all and there is the gap 110 existing between the pair of stock gates 102A and 102B when they are closed.

When the gates 102A and 102B do not overlap, an alternate embodiment gate latching system is employed. The alternate embodiment employs a pair of alternate latching devices 10A' and 10B' where the two alternate latching devices 10A' and 10B' are constructed different from each other and with each of the alternate latching devices 10A' and 10B' of the pair being designed for attachment to a separate gate 102A or 102B of a non-overlapping pair of gates 102A and 102B.

Referring now also to FIGS. 10 and 11, the alternate first latching device 10A' of the pair of alternate latching devices 10A' and 10B' secures via alternate first u-bolts 12A' around a horizontal member 108A of a first gate 102A of the pair of gates 102A and 102B and is provided with a first arm 20A that extends several inches to an alternate first u-shaped receiver 14A'. One or both of the alternate first u-bolts 12A' are adjustable along the length of the first arm 20A. The alternate first u-shaped receiver 14A' is approximately aligned with the alternate first u-bolts 12A' so the alternate first u-shaped receiver 14A' faces or opens downward and is able to rest over a horizontal member 108B of the opposite non-overlapping second gate 102B when the gates 102A and 102B are closed.

The alternate second latching device 10B' of the pair of alternate latching devices 10A' and 10B' secures via alternate second u-bolts 12B' around a horizontal 108B of the second gate 102B of the pair of gates 102A and 102B and is provided with a second arm 20B that extends several inches to an alternate second u-shaped receiver 14B'. The alternate second u-shaped receiver 14B' is aligned with the alternate second u-bolts 12B' so the alternate second u-shaped receiver 14B' faces or opens upward and is able to receive a horizontal member 108A of the opposite non-overlapping first gate 102A when the gates 102A and 102B are closed.

One or both of the alternate second u-bolts 12B' are adjustable along the length of the second arm 20B.

The alternate second latching device 10B' is also provided with an alternate hinged lid 16' attached to the alternate second u-shaped receiver 14B' that can be pivoted open to admit the horizontal member 108A of the first gate 102A into the alternate second u-shaped receiver 14B' and can be pivoted closed to secure the horizontal member 108A of the first gate 102A within the alternate second u-shaped receiver 14B'. The alternate second u-shaped receiver 14B' and the alternate hinged lid 16' are each provided with an alternate eye 18' located so that the alternate eyes 18' align when the alternate hinged lid 16' is closed and are capable of receiving therein a padlock (not illustrated) as a means of locking the gates 102A and 102B against unauthorized entry.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A gate latching system comprising:
   a first latching device secured on a first tubular gate by at least one u-bolt where said first tubular gate is pivotally secured by a hinge to a support and a second latching device secured on a second tubular gate by at least one u-bolt where said second tubular gate is pivotally secured by a second hinge to a second support, said first latching device includes a receiver configured to receive a horizontal member of the second tubular gate and said second latching device includes a receiver configured to receive a horizontal member of the first tubular gate, and
   a lid carried by said first latching device, said lid pivotable on a hinge movable from a first open position to a second closed position wherein when said lid is in said closed position with said horizontal member of said second gate positioned in said receiver of said first latching device, said lid retains said horizontal member of the second tubular gate within the receiver.

2. A gate latching system according to claim 1 further comprising:
   an extended arm carried by said first latching device, said extended arm having a length sufficient to extend beyond a gap defined between said first tubular gate and said second tubular gate when said first tubular gate and said second tubular gate are in a closed position.

3. The gate latching system of claim 1, wherein said receiver of said first latching device opens upward and said receiver of said second latching device opens downward.

4. A gate latching system comprising:
   a first latching device and a second latching device,
   said first latching device secured to a first tubular gate by at least one u-bolt, where said first tubular gate is pivotally secured by a first hinge to a first support and the second latching device secured to a second tubular gate by at least one u-bolt, where said second tubular gate is pivotally secured by a second hinge to a second support;
   said first latching device includes a receiver for receiving therein a member of the second tubular gate when said first latching device is installed on said first tubular gate and said second latching device includes a receiver for receiving a member of the first tubular gate when said second latching device is installed on said second tubular gate;

a lid carried by said first latching device, said lid pivotable on a hinge movable from a first open position to a second closed position such that said lid closes over said receiver of said first latching device, wherein when said first latching device is installed on said first tubular gate and said second latching device is installed on said second tubular gate and when said lid is in the closed position with said member of the second tubular gate within said receiver of said first latching device, said lid of said first latching device secures said first tubular gate and said second tubular gate together in the closed position.

5. The gate latching system of claim 4, further comprising:

an elongated arm having a first end and a second end, said first end of said elongated arm configured to be secured to said first tubular gate and said second end of said elongated arm carries said first latching device wherein said elongated arm has a length sufficient to position said receiver of said first latching device at a location to receive a tubular member of said second tubular gate.

6. The gate system of claim 5, wherein said receiver of said first latching device opens upward and said receiver of said second latching device opens downward.

\* \* \* \* \*